(12) United States Patent
Miyoshi

(10) Patent No.: US 7,163,020 B2
(45) Date of Patent: Jan. 16, 2007

(54) WALKING STICK MOUNTED WITH CASTERS

(75) Inventor: Etsuo Miyoshi, Higashikagawa (JP)

(73) Assignee: Swany Corporation, Kagawa (JP)

( * ) Notice: Subject to any disclaimer, the term of this patent is extended or adjusted under 35 U.S.C. 154(b) by 352 days.

(21) Appl. No.: 10/680,127

(22) Filed: Oct. 8, 2003

(65) Prior Publication Data

US 2004/0069335 A1 Apr. 15, 2004

(30) Foreign Application Priority Data

Oct. 10, 2002 (JP) .............................. 2002-298100

(51) Int. Cl.
  *A61H 3/04* (2006.01)
(52) U.S. Cl. ........................................................ 135/67
(58) Field of Classification Search ................. 135/67, 135/66; 280/47.34, 47.35, 79.11, 79.2, 79.3; 190/18 R, 18 A
  See application file for complete search history.

(56) References Cited

U.S. PATENT DOCUMENTS

| | | | | |
|---|---|---|---|---|
| 3,522,955 A | * | 8/1970 | Warner, Jr. | 280/655.1 |
| 4,032,165 A | * | 6/1977 | Russell | 280/79.3 |
| 4,165,088 A | * | 8/1979 | Nelson | 280/79.3 |
| 5,762,168 A | * | 6/1998 | Miyoshi | 190/18 A |
| 5,806,143 A | * | 9/1998 | Tsai | 280/655.1 |
| 5,908,093 A | * | 6/1999 | Miyoshi | 190/18 A |
| 6,024,376 A | * | 2/2000 | Golichowski et al. | 280/655.1 |
| 6,032,966 A | * | 3/2000 | Young | 280/47.34 |
| 2004/0231939 A1 | * | 11/2004 | Miyoshi | 190/18 A |

FOREIGN PATENT DOCUMENTS

| | | |
|---|---|---|
| DE | 724 699 | 9/1942 |
| DE | 10033698 A1 * | 5/2002 |
| FR | 2612476 A1 * | 9/1988 |
| FR | 2696929 A1 * | 4/1994 |
| GB | 2 347 341 | 9/2000 |
| JP | 9-38161 | 2/1997 |
| JP | 10-86824 | 4/1998 |

\* cited by examiner

*Primary Examiner*—Tamara L. Graysay
(74) *Attorney, Agent, or Firm*—Wenderoth, Lind & Ponack, L.L.P.

(57) ABSTRACT

A stick mounted with casters, a lower end of a stick main body in which extensible vertical rods are connected to both ends of a grip extending in a horizontal direction is connected to a rectangular horizontal loading table. The vertical rods are self-standing through casters fixed at four corners of a lower face of the horizontal loading table, and a bag is detachably attached on the horizontal loading table. The outer diameter of a wheel of the caster is 30 to 60 mm, and the caster is attached to the horizontal loading table such that a rotational shaft can rotate in the horizontal plane. The grip of the stick main body extends along a longitudinal direction of the horizontal loading table. The vertical rods are curved or tilted so that the grip is located at a central section of the horizontal loading table.

7 Claims, 8 Drawing Sheets

PRIOR ART

WALKING STICK MOUNTED WITH CASTERS

This application is based on applications No. 2002-298100 filed in Japan on Oct. 10, 2002, the content of which is incorporated hereinto by reference.

BACKGROUND OF THE INVENTION

The present invention relates to a walking stick mounted with casters.

A generally used walking stick is not provided with casters at its lower end. When a user walks ahead by using the walking stick, it is necessary to detach a lower end of the walking stick from the ground and move the stick forward. When the lower end of the stick leaves the ground, the stick can not support a body of the user, resulting in that this type of the stick has a disadvantage in not being able to support the body of the user continuously. If the casters are fixed at a lower end of the walking stick, there is no need to detach the lower end of the stick from the ground, so that the body of the user can be supported continuously. However, in the structure provided with the casters fixed at the lower end of the single stick, the lower end of the stick moves slidingly due to the casters, so that the body of the user can not be supported securely. To solve the problem of the stick falling down back and forth, for example, casters 130 can be provided at front and rear sections of a carrier as disclosed in Japanese Unexamined Patent Publication (KOKAI) No. 10-86824, the content of which is incorporated hereinto by reference. The carrier can be used in the conditions shown in FIG. 1 and FIG. 2 by changing orientations of the casters 130. However, the carrier with this structure has a drawback in falling down in right and left directions, resulting in not being able to support the body of the user stably and securely. In order to support the body of the user securely, it is necessary that a handle 131 having the lower ends fixed with the casters 130 stably stands on its own. As a device which can support the body of the user instead of the stick, a walker is used. Since a generally used walker is big, the places where the walker can be used is limited. A walker that is compact and conveniently used is disclosed in Japanese Unexamined Patent Publication (KOKAI) No. 9-38161, the content of which is incorporated hereinto by reference. In the walker disclosed in this publication, as shown in FIG. 3, four casters 330 are fixed at lower ends of a frame 332 bent in a U-shape. In order to provide the self-standing frame 332, legs 333 extending in the lateral direction are fixed at the lower ends of the frame 332, and the casters 330 are fixed to both ends of each leg 333.

In the walker disclosed in this publication, as shown in FIG. 3 and FIG. 4, a collapsible chair 334 is connected in the middle of the frame 332, and a basket 335 is connected to one side of an upper section thereof. In the walker with this structure, the body of the user can be supported by the frame 332 that stands on its own because of the four casters 330. Further, since the basket 335 is provided, the walker has an advantage in that baggage to be carried can be stored in the basket 335. In this walker, however, since the basket 335 protrudes laterally from the frame 332, there is a drawback in having the wide lateral width. Also, there is a drawback in that the walker tends to fall down sidewise when heavy baggage is stored in the basket 335. If the legs 333 fixed at the lower ends of the frame 332 are elongated in order to solve these drawbacks, the overall lateral width becomes much wider, so that the places that it can be used is much more limited. It is especially important for the stick to reduce the restriction of the places it can be used. This is because the field of activity of the user is restricted if the places where the stick is used is limited. In order to prevent the field of activity of the user from being restricted, it is important for the stick to be allowed on board a vehicle, such as a train and a plane. Therefore, the stick is required to be compact when being carried as well as to support the body of the user stably and securely when being used. However, the characteristic of supporting the body of the user securely and the characteristic of being compact so as not to restrict the places it can be used are conflicting characteristics, and it is extremely difficult to satisfy both characteristics.

The present invention has been made to solve these drawbacks. An important object of the invention is to provide a walking stick mounted with casters which is compact as a whole so as to have an extremely small restriction of the place to be used while being able to support the body of the user stably and securely.

Also, another important object of the invention is to provide a walking stick mounted with casters which can be moved stably and easily even when storing baggage.

SUMMARY OF THE INVENTION

A stick mounted with casters of the invention comprises a stick main body in which extensible vertical rods are connected to both ends of a grip extending in a horizontal direction; a horizontal loading table having a rectangular shape connected to a lower end of the stick main body and making the vertical rods to be self-standing through casters fixed at four corners of a lower face of the horizontal loading table; and a bag detachably attached on the horizontal loading table. The casters provided at the four corners of the horizontal loading table are attached to the horizontal loading table such that wheels each having an outer diameter in a range of 30 to 60 mm can be freely moved on a horizontal plane in any moving direction by rotating rotational shafts in a horizontal plane. In the stick main body, lower end sections of the vertical rods are fixed at both end sections of one of the long sides of the rectangular horizontal loading table while the grip is in a posture extending along a longitudinal direction of the rectangular horizontal loading table.

Further, in the stick mounted with casters of the invention, the vertical rods are curved or tilted from one side of the rectangular shape, in which the lower end sections of the vertical rods are fixed, toward a direction of placing the grip connected to upper ends of the vertical rods to be at a center section of the horizontal loading table. Alternatively, projecting sections for fixing the casters are provided at side sections of the horizontal loading table to which the vertical rods are fixed, so as to place the grip of the stick main body between the casters at both sides.

The grip can be disposed above the bag in the state in which the vertical rods are retracted. The width of the rectangular horizontal loading table can be set at 10 to 25 cm. Further, the length of the horizontal loading table is set longer than the width thereof, and can be set at 22 to 50 cm.

The stick mounted with casters described above has the advantage that the overall size thereof is made compact so that the restriction of the places it can be used is extremely reduced while the stick can support the body of the user securely and stably. Especially, since the lower end of the stick can be moved by the casters, without detaching the lower end of the stick from the ground, the body of the user can be supported continuously and securely as compared with the generally used stick. This is because of the following reasons. Firstly, the rectangular horizontal loading table is connected to the lower end of the stick main body, in which the vertical rods are connected to both ends of the grip in the stick of the invention, and the bag is detachably attached to the horizontal loading table and the casters for allowing the wheels with the outer diameter of 30 to 60 mm to be freely rotatable on a horizontal plane are fixed at the four corners of the horizontal loading table. Further, while the grip of the stick main body is in the posture of extending along the longitudinal direction of the rectangular horizontal loading table, the lower end sections of the vertical rods are fixed at both side sections of one of the long sides of the horizontal loading table with the rectangular shape, and the vertical rods are curved or tilted toward the direction of placing the grip to be located at the center of the horizontal loading table. Alternatively, the protruding sections can be provided at the side sections of the horizontal loading table, and the casters are disposed at the protruding sections, so as to place the grip between the casters at both sides. Especially, in the stick of this structure, since the grip is placed in the middle of the casters provided at both sides of the horizontal loading table while the vertical rods are connected to the side sections of the horizontal loading table, the stick does not wind even if the grip is pushed lengthwise, and the stick can be moved in the desirable direction while the body of the user is being supported.

Still further, the stick of the invention has an advantage that the stick can be moved stably and easily even in the state of storing the baggage. This is because the stick can be moved while the bag for storing the baggage is placed on the horizontal loading table connected to the lower ends of the vertical rods.

The above and further objects and features of the invention will be more fully apparent from the following detailed description in conjunction with the accompanying drawings.

DETAILED DESCRIPTION OF THE PREFERED EMBODIMENTS

Figure 1:
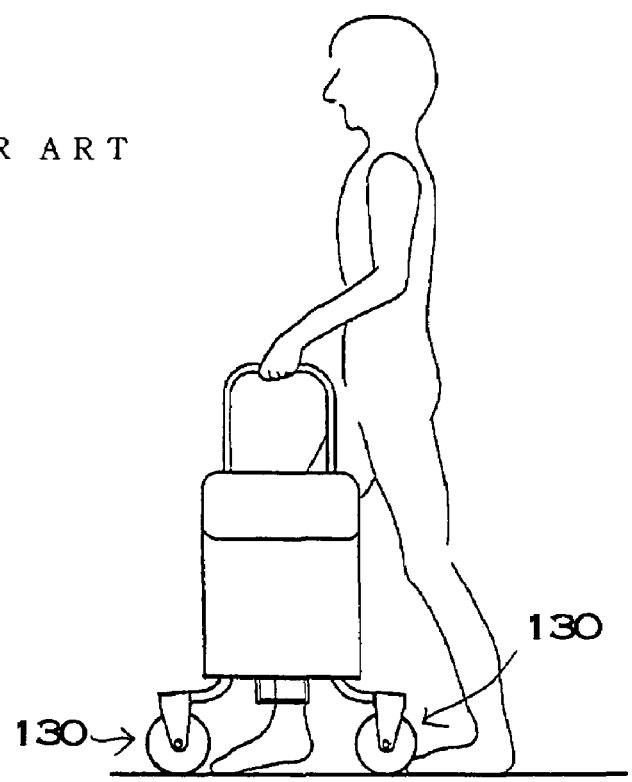
FIG. 1 is a side view showing a state in which a conventional carrier is used.
Figure 2:
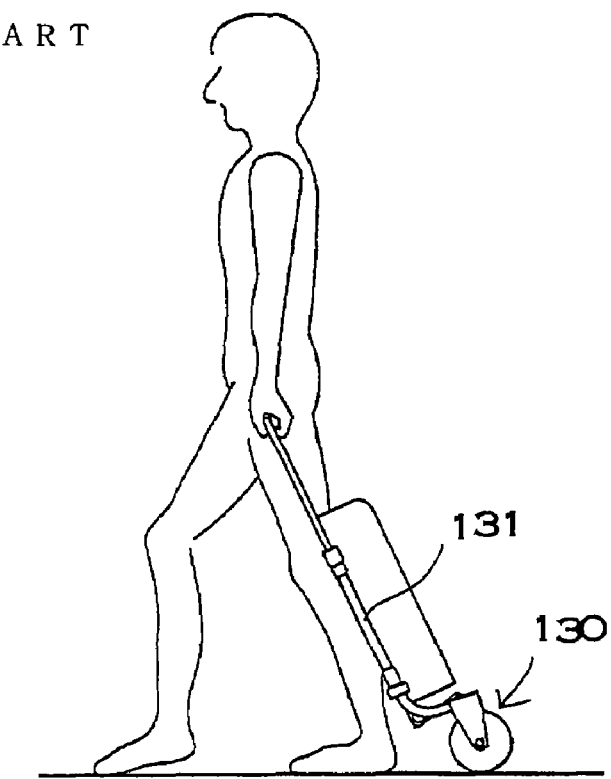
FIG. 2 is a side view showing another state in which the carrier shown in FIG. 1 is used.
Figure 3:
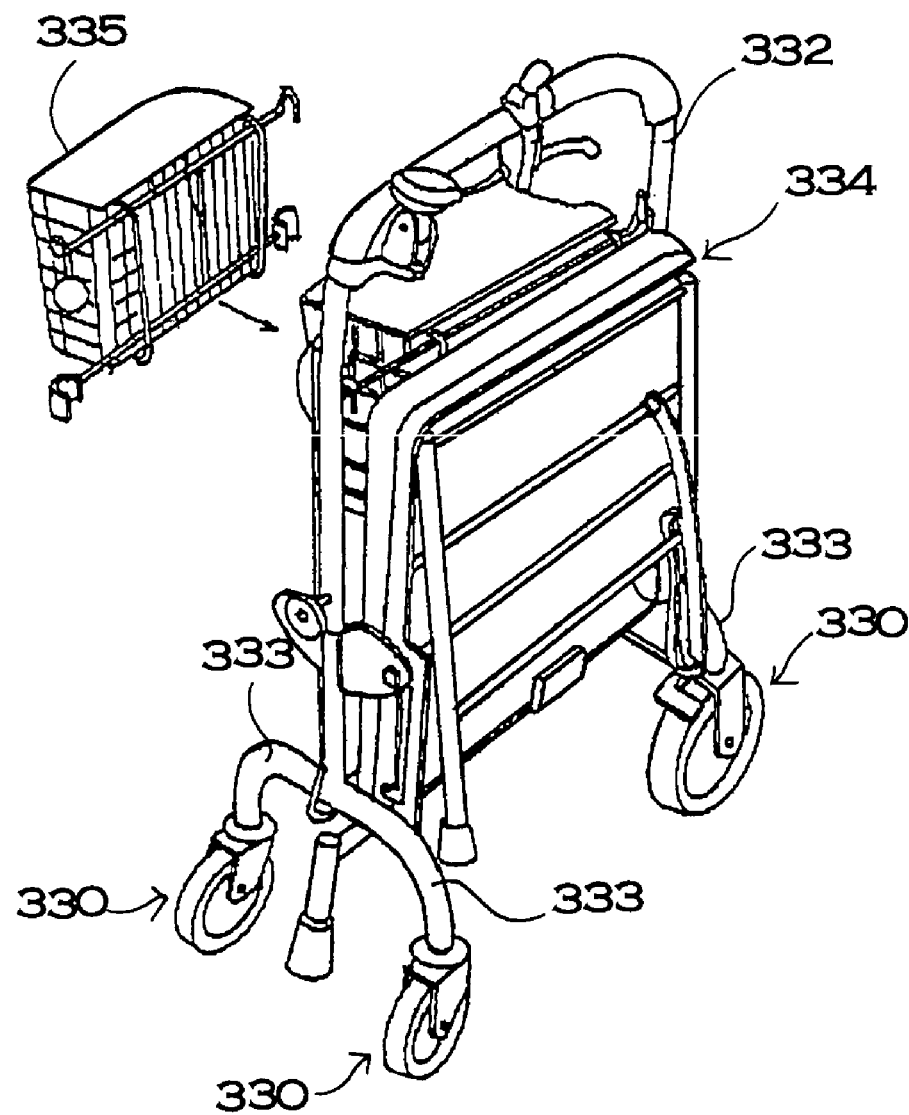
FIG. 3 is a perspective view showing an example of a conventional walker.
Figure 4:
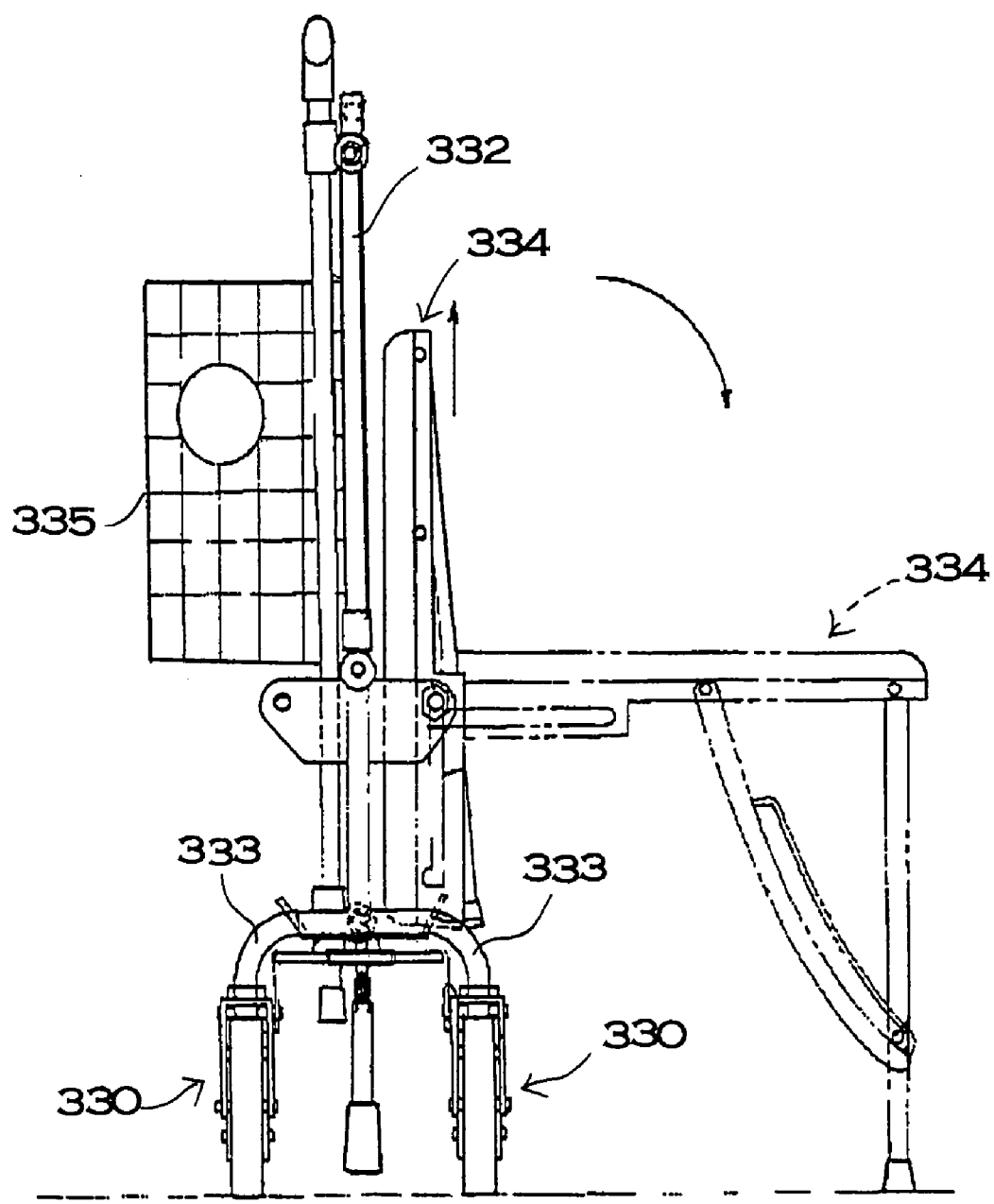
FIG. 4 is a front view of the walker shown in FIG. 3.
Figure 5:
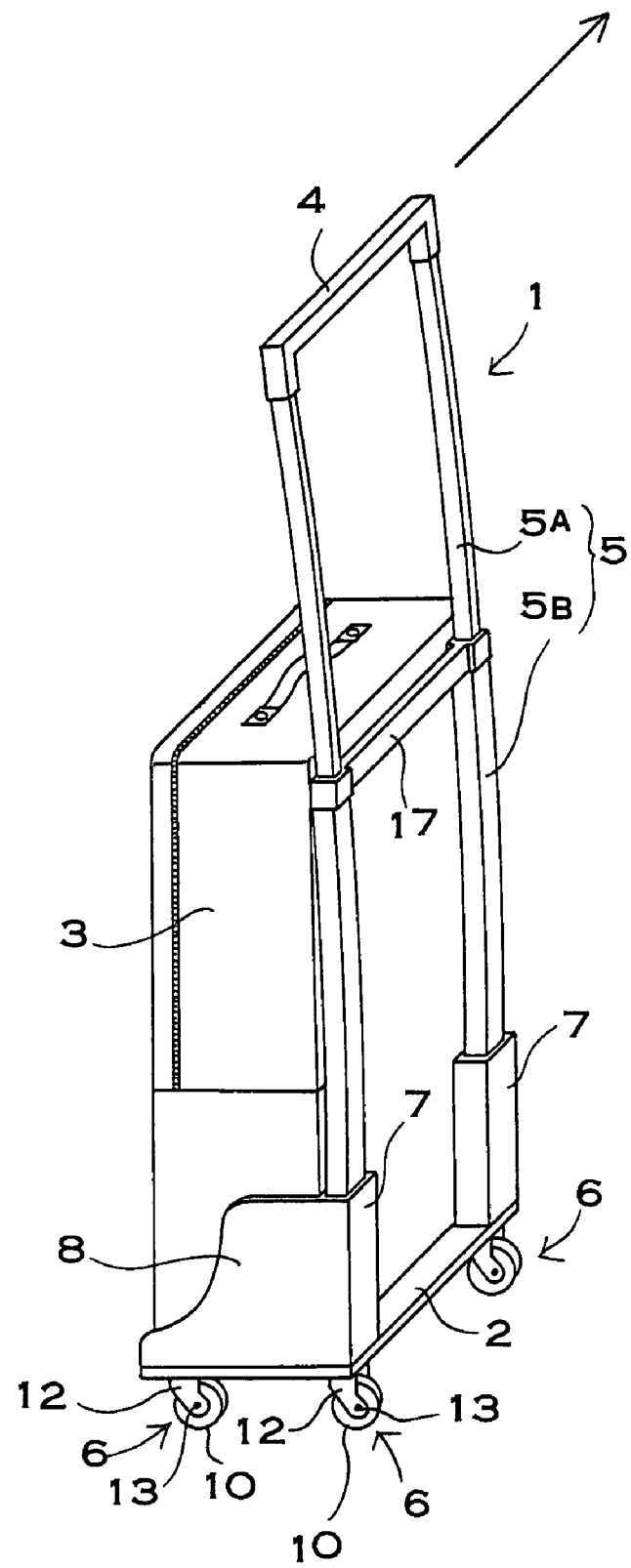
FIG. 5 is a perspective view of a walking stick mounted with casters according to an embodiment of the invention.
Figure 6:
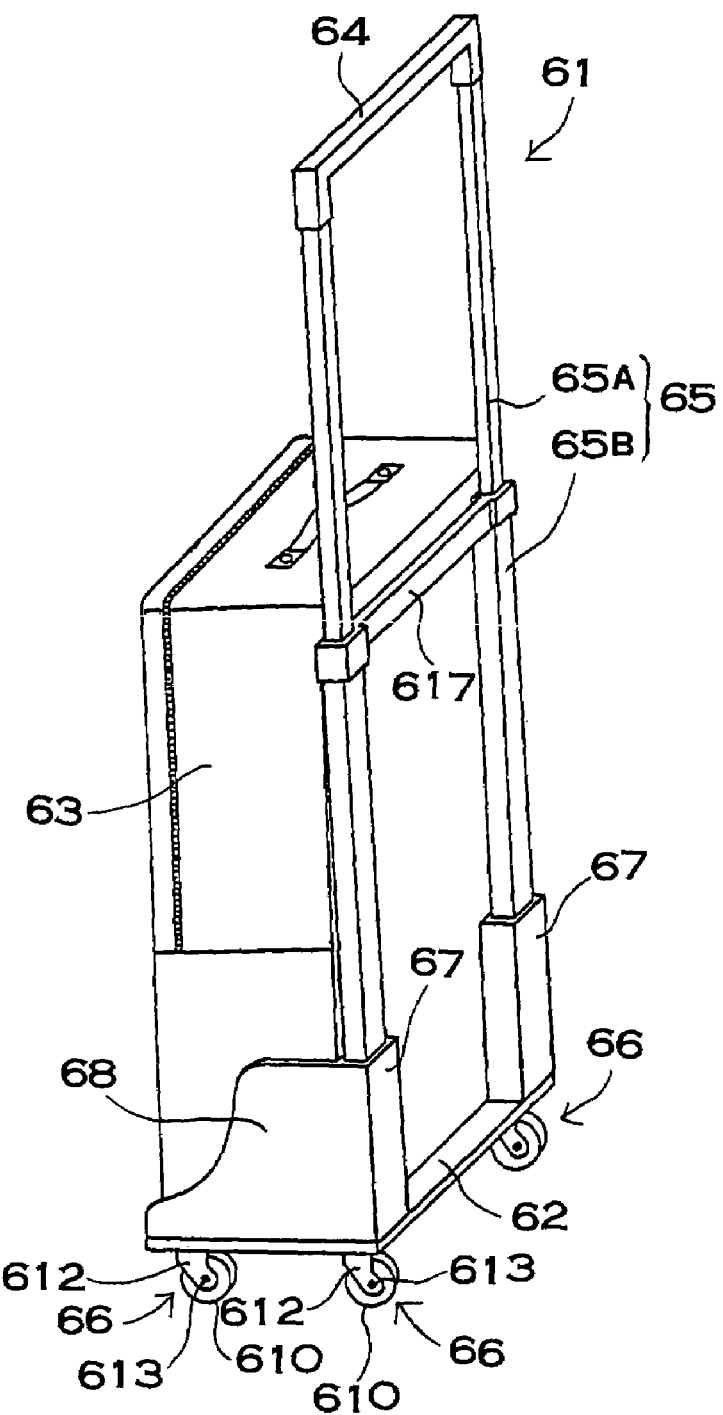
FIG. 6 is a perspective view of a walking stick mounted with casters according to another embodiment of the invention.
Figure 7:
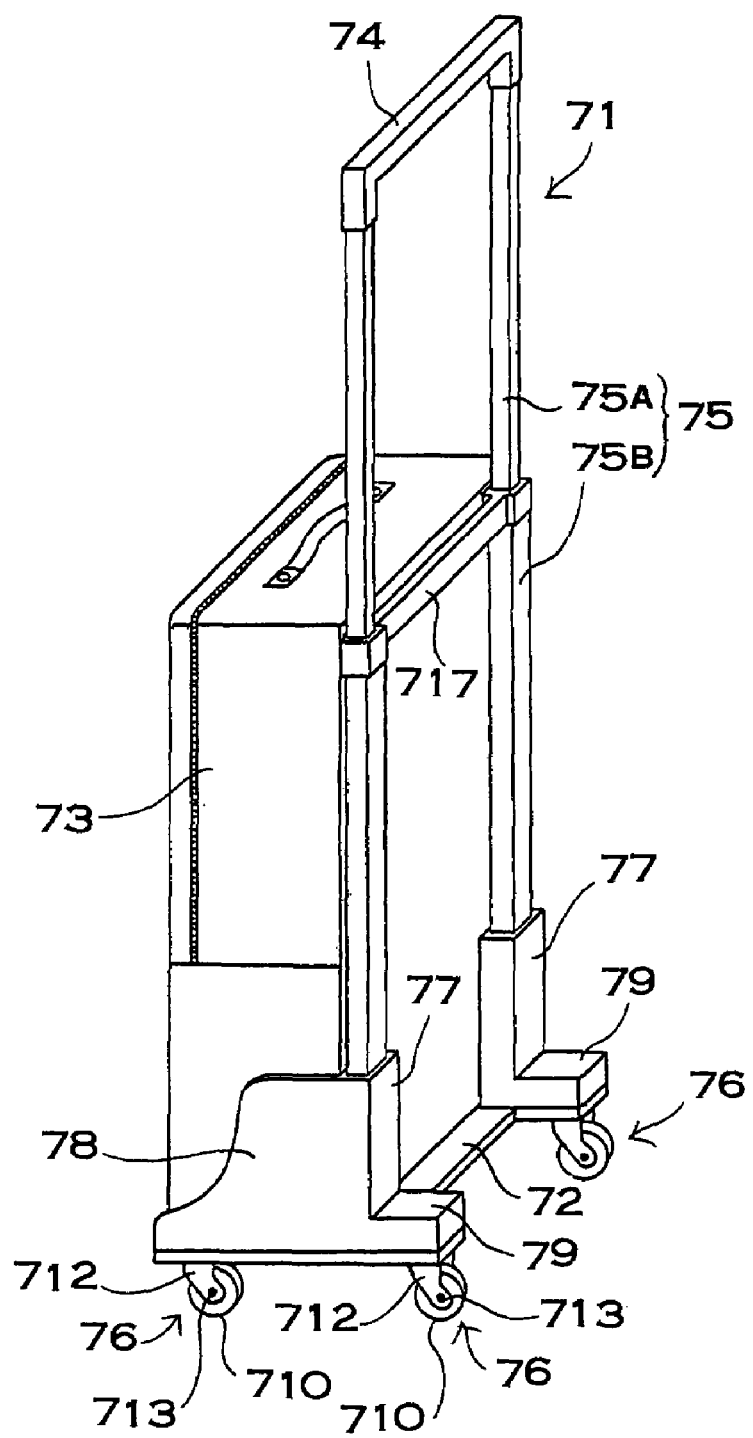
FIG. 7 is a perspective view of a walking stick mounted with casters according to still another embodiment of the invention.

A walking stick shown in FIG. 5 to FIG. 7 includes a stick main body 1, 61, 71 in which extensible vertical rods 5, 65, 75 are connected to both ends of a grip 4, 64, 74 extending in a horizontal direction; a rectangular horizontal loading table 2, 62, 72 which is connected to a lower end of the stick main body 1, 61, 71 and helps the vertical rods 5, 65, 75 to be self-standing through casters 6, 66, 76 fixed at four corners of a lower face of the horizontal loading table; and a bag 3, 63, 73 detachably attached on the horizontal loading table 2, 62, 72.

In order to have the stably self-standing vertical rods 5, 65, 75, the width of the horizontal loading table 2, 62, 72 is set at 10 to 25 cm, preferably at 12 to 20 cm, and most preferably at around 15 cm. If the width of the horizontal loading table 2, 62, 72 is set narrower than 10 cm, the stick main body 1, 61, 71 tends to fall down sidewise; and if being set wider than 25 cm, the stick can not be moved conveniently in small places. Further, in the horizontal loading table 2, 62, 72, the length thereof is set longer than the width so as to be 22 to 50 cm, preferably 25 to 50 cm, more preferably 30 cm to 45 cm, and most preferably 35 cm to 45 cm. If the horizontal loading table 2, 62, 72 is too short, the stick main body tends to fall down when being pushed; and on the contrary, if the horizontal loading table 2, 62, 72 is too long, the stick becomes too big, resulting in a drawback such that the stick can not be carried conveniently.

The horizontal loading table 2, 62, 72 shown in the drawings is integrally formed of a plastic as a whole. The horizontal loading table 2, 62, 72 is integrally formed with ribs extending lengthwise and crosswise on a lower face of the table, so as to provide a light and strong structure. Further, through-holes are provided between the ribs to provide a light structure. The horizontal loading table 2, 62, 72 shown in the drawings is integrally formed with connection pipes 7, 67, 77 for connecting the vertical rods 5, 65, 75 of the stick main body 1, 61, 71. In order to provide a structure in which the connection pipes 7, 67, 77 are securely prevented from falling down, vertical walls 8, 68, 78 are integrally formed along short sides of the rectangular horizontal loading table 2, 62, 72, and the vertical walls 8, 68, 78 are connected to the connection pipes 7, 67, 77. The height of the vertical wall 8, 68, 78 is configured so as to increase gradually toward the connection pipes 7, 67, 77.

Figure 8:
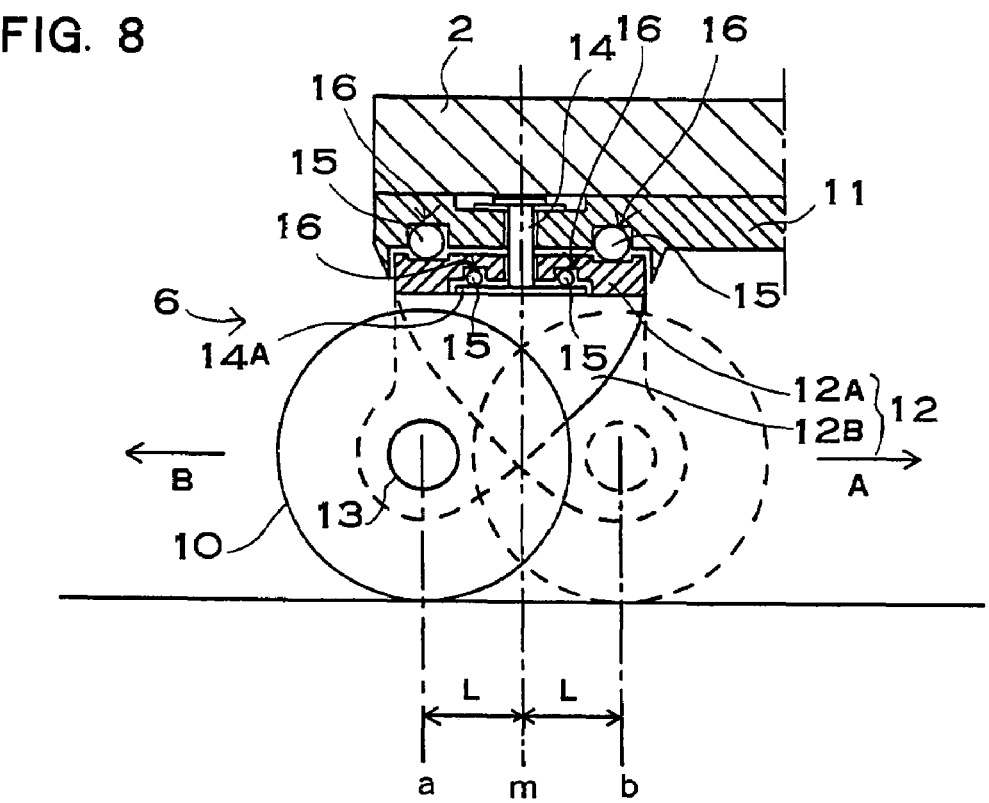
FIG. 8 is an enlarged sectional view of a caster.

The casters 6, 66, 76 are fixed at the four corners of the lower face of the horizontal loading table 2, 62, 72, such that the stick main body 1, 61, 71 in the self-standing posture can be moved while the horizontal loading table 2, 62, 72 is in the horizontal posture. The casters 6, 66, 76 can freely swivel, and so-called "swivel wheels" are used as the casters. In the caster 6, 66, 76, it is important to specify an outer diameter of a wheel 10, 610, 710. That is because it becomes difficult to have a stable self-standing stick main body 1, 61, 71 while the horizontal loading table 2, 62, 72 is made small if the outer diameter of the wheel 10, 610, 710 is increased. As shown in FIG. 8, in the caster 6 with a swivel structure called a "swivel wheel" which can turn freely on a horizontal plane, when the horizontal loading table 2 is moved in the directions shown by arrows in the drawing, the direction of the caster 6 is automatically adjusted. In the caster 6 with this structure, a center line m where the caster 6 is connected to be capable of turning on the horizontal plane and a position a where the wheel 10 makes contact with the ground are shifted. The contact position between the wheel 10 and the ground changes in accordance with the moving direction of the caster 6. Therefore, when the caster 6 is moving in a direction shown by an arrow A is moved in a direction shown by an arrow B, the position where the wheel 10 makes contact with the ground is changed from the position a to the position b. Although the stick moves in the longitudinal direction of the grip 4 in most of the cases, the stick sometimes moves laterally. When the stick is moved laterally such that the position where the wheel 10 of the caster 6 makes contact with the ground is shifted, the stick main body 1 may not stand on its own vertically and stably. Especially, in the stick of the invention, since the width of the horizontal loading table 2 is limited to permit the stick to be moved conveniently in a narrow place or a crowded space, if the position where the wheel 10 of the caster 6 makes contact with the ground is changed, the stick main body 1 may not stand on its own stably. In order to solve this problem, the caster 6 is configured to specify the outer diameter of the wheel 10 at 60 mm or less. If the outer diameter of the wheel 10 is too small, the caster 6 may not move smoothly on a bumpy road surface. Therefore, in the caster 6, the outer diameter of the wheel 10 is specified at 30 to 60 mm, preferably at 40 to 50 mm, and more preferably at about 45 mm.

The caster 6 includes a base 11 fixed to the horizontal loading table 2; a U-shaped member 12 connected to the base 11 so as to be able to turn in the horizontal plane; and the wheel 10 connected to the U-shaped member 12 through a rotational shaft 13 so as to be capable of rotating. The wheel 10 is rotatably connected to the rotational shaft 13, and the rotational shaft 13 is connected to both ends of the U-shaped member 12. The U-shaped member 12 is formed by bending a metal plate in a U-shape, and is formed of a horizontal plate section 12A connected to the base 11 and side plate arm sections 12B connected to both sides of the horizontal plate section 12A. In the U-shaped member, the horizontal plate section and the side plate arm sections can be integrally formed of a hard plastic. The horizontal plate section 12A is connected to the base 11 by means of a vertical shaft 14 penetrating the horizontal plate section such that the horizontal plate section can rotate in a horizontal plane. In the U-shaped member 12, in order to swivel by smoothly turning even in the state in which the load is applied to the wheel 10, a plurality of steel balls 15 are provided in upper and lower faces of the horizontal plate section 12A. A plurality of steel balls 15 are disposed between the horizontal plate section 12A and the base 11, and disposed between the horizontal plate section 12A and a flange section 14A provided at the lower end of the vertical shaft 14. These steel balls 15 are circularly disposed around the vertical shaft 14. In order to arrange the steel balls 15 circularly, circular slots 16 are provided at opposed surfaces of the base 11 and the horizontal plate section 12A, and at opposed surfaces of the flange section 14A of the vertical shaft 14 and the horizontal plate section 12A. A plurality of steel balls 15 are provided in the circular slots 16 so as to roll therein. In the side plate arm section 12B, in order to swivel freely when the caster 6 is moved, a position where the rotational shaft 13 of the wheel 10 is connected and a position where the side plate arm section 12B is connected to the base 11 through the rotational shaft 14 are shifted with a distance L in the horizontal plane. Although the distance L is adjusted at the optimum value according to the size of the wheel 10, the distance L is preferably ½ to ¼ of the diameter of the wheel 10. Note, in FIG. 6 and FIG. 7, 612 and 712 represent U-shaped members, 613 and 713 represent rotational shafts, respectively.

In the stick main body 1, 61, 71, the extensible vertical rods 5, 65, 75 are connected to both ends of the grip 4, 64, 74 extending in the horizontal direction. In the stick main body 1, 61, 71, while the grip 4, 64, 74 is in the posture extending along the longitudinal direction of the horizontal loading table 2, 62, 72, the lower end sections of the vertical rods 5, 65, 75 are fixed at both end sections of one of long sides of the rectangular horizontal loading table 2, 62, 72. The grip 4, 64, 74 is connected to the horizontal loading table 2, 62, 72 through the vertical rods 5, 65, 75 and is required to be located at a position that is closer to the middle of the casters 6, 66, 76 at both sides. This is to prevent the stick from winding by pushing the grip 4, 64, 74 longitudinally.

In the stick shown in FIG. 5, the vertical rods 5 are curved. More specifically, the vertical rods 5 are curved in a direction such that the grip 4 connected to the upper ends of the vertical rods 5 is positioned at a center section of the horizontal loading table 2, from one side of the rectangular shape to which the lower ends of the vertical rods 5 are connected. Namely, the vertical rods 5 are curved from both sides of the horizontal loading table 2 toward the center section thereof. In the stick shown in FIG. 6, the vertical rods 65 are tilted. More specifically, the vertical rods 65 are tilted in a direction that the grip 64 connected to the upper ends of the vertical rods 65 is positioned at a center section of the horizontal loading table 62, from one side of the rectangular shape to which the lower ends of the vertical rods 65 are connected. Further, in the stick shown in FIG. 7, the linear vertical rods 75 are fixed vertically to the horizontal loading table 72. In this stick, in order to place the grip 74 of the stick main body 71 closer to the middle section of the four casters 76, protruding sections 79 for fixing the casters 76 are provided at side sections of the horizontal loading table 72 to which the vertical rods 75 are fixed. The casters 76 are provided at lower faces of the protruding sections 79 such that the grip 74 of the stick main body 71 is placed between the casters 76 at both sides.

Figure 9:
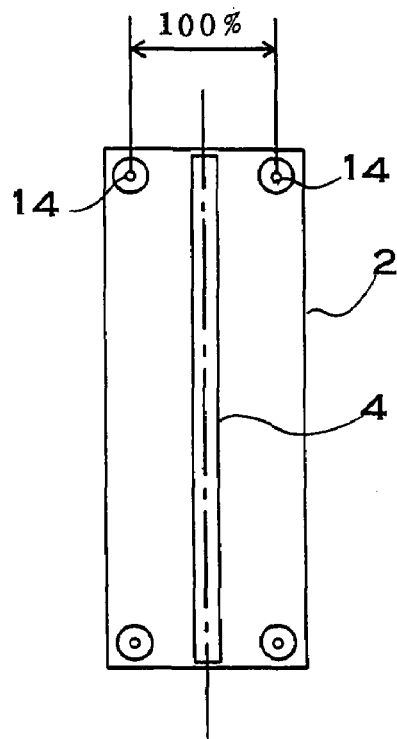
FIG. 9 is a plan view showing a positional relationship between a grip and a horizontal loading table.

Although the stick shown in FIG. 5 to FIG. 7 has structures in which the center of the grip 4, 64, 74 is ideally located at the center among the casters 6, 66, 76 at both sides, it is not always necessary to place the grip at the center among the casters at both sides. This is because the stick can be moved forward without winding by pushing the grip 4 in the longitudinal direction as shown by the arrow in FIG. 5 even if the grip 4 is not located at the center among the casters and is shifted from the center section. However, as the grip is placed closer to the casters at both sides, the longitudinal movement becomes more difficult. Thus, as shown in the plan view of FIG. 9, presuming that the interval of the caster mounting positions fixed to both sides of the horizontal loading table 2 is set as 100%, the center position of the grip 4 is placed at a position of 20 to 80%, and preferably at a position of 25 to 75%. Since the contact position of the caster 6 with respect to the ground is shifted in accordance with the direction of moving the horizontal loading table 2, the mounting position of the caster 6 is defined as the position of the vertical shaft 14 which connects the U-shaped member 12 of the caster 6 to the base 11

The vertical rods 5, 65, 75 are stopped by stoppers at the position where the grip 4, 64, 74 is pulled up and at the position where the grip is lowered. The vertical rods are stopped at the position where the grip 4, 64, 74 is pulled up when the casters 6, 66, 76 are moved by pushing the grip 4, 64, 74 and when the user rests in the stopped condition by leaning on the stick under the state that the casters 6, 66, 76 are not moved. The stopper prevents the grip 4, 64, 74 from lowering in these conditions of use. The vertical rods 5, 65, 75 are stopped in a state in which the grip 4, 64, 74 is lowered when the stick is lifted up to be carried while the grip 4, 64, 74 is gripped by hand.

The entire length of the vertical rod 5, 65, 75 is designed such that the height from the lower end of the caster 6, 66, 76 to the grip 4, 64, 74 in the state that the grip 4, 64, 74 is pulled all the way up to the maximum extended position is around 80 cm. However, the height from the lower end of the caster to the grip can be modified within the range from 60 to 100 cm. If the height of the grip is set at around 80 cm, the stick can be pushed and moved most easily, and the user can lean on the stick easily.

The vertical rod 5, 65, 75 includes an extensible rod 5A, 65A, 75A having an upper end connected to the grip 4, 64, 74; and a guide pipe 5B, 65B, 75B connected to the extensible rod 5A, 65A, 75A such that the extensible rod is vertically movable 5A, 65A, 75A. Lower ends of the guide pipes 5B, 65B, 75B are inserted into the connection pipes 7, 67, 77 of the horizontal loading table 2, 62, 72 and connected thereto, and upper ends of the guide pipes are connected to each other by a lateral rod 17, 617, 717. The guide pipes 5B, 65B, 75B have cylinder shapes allowing the extensible rods 5A, 65A, 75A to be inserted thereinto and pulled out therefrom by sliding the same. In the vertical rod 5, 65, 75 with this structure, the extensible rod 5A, 65A, 75A is inserted into and pulled out from the guide pipe 5B, 65B, 75B so as to expand and retract the vertical rod, resulting in that the position of the grip 4, 64, 74 can be adjusted vertically. The vertical rod 5, 65, 75 shown in the drawings has a two segment structure in which the single extensible rod 5A, 65A, 75A is inserted into and pulled out from the guide pipe 5B, 65B, 75B. However, the vertical rod can have a five segment structure by providing an intermediate rod between the extensible rod and the guide pipe. In this vertical rod with the five segment structure, although not shown in the drawings, the extensible rod is inserted into the intermediate rod to be pulled out and retracted, and at the same time, the intermediate rod is inserted into the guide pipe to be pulled out and retracted, to thereby achieve the five segment structure. In the vertical rod with the five segment structure, since the extensible rod and the intermediate rod are inserted into the guide pipe, in the state in which the grip is pushed down to the lowest position, the stick main body can be retracted so as to be compact, so that the height thereof can be lowered. Therefore, in this stick, the overall size can be made compact by lowering the height of the bag placed on the horizontal loading table. As described above, the stick, which can be made compact as a whole in the state in which the grip is lowered, can be carried extremely easily.

Figure 10:
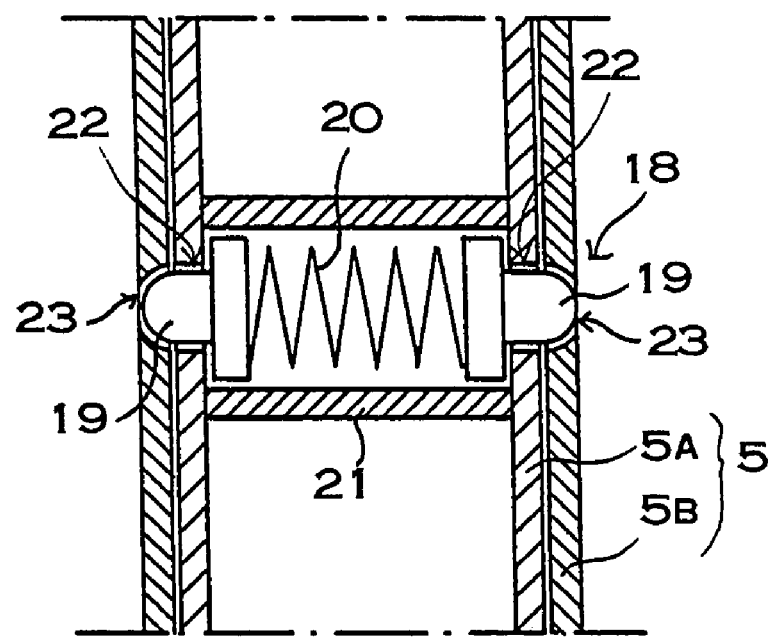
FIG. 10 is an enlarged sectional view of a main part of an example of a vertical rod and a stopper.

At the position where the extensible rod 5A, 65A, 75A is pulled up to the maximum extended position, the extensible rod is stopped by the stopper to prevent lowering. As the stopper, there can be used all structures which can stop the vertical rod at the condition of being pulled up. A stopper for stopping the extensible rod 5A at the position of being pulled up to the maximum is shown in FIG. 10. A stopper 18 shown in FIG. 10 includes, inside the extensible rod 5A, an elastic projection 19 elastically projected in a radial direction; a spring 20 for pushing the elastic projection 19 outwardly; and a pipe 21 for storing the spring 20 and the elastic projection 19 therein. The elastic projection 19 is pushed by the spring 20 to project from a through-hole 22 of the extensible rod 5A in the radial direction, and is inserted into a stopper hole 23 provided in the guide pipe 5B. The elastic projection 19 is disposed at the lower end section of the extensible rod 5A, and the stopper hole 23 is bored at the upper end section of the guide pipe 5B. In the stopper 18 with this structure, when the extensible rod 5A is pulled up from the guide pipe 5B, the elastic projection 19 is inserted into the stopper hole 23. In this state, the extensible rod 5A is prevented from lowering with respect to the guide pipe 5B. When the extensible rod 5A is to be lowered, the extensible rod 5A is forcefully pushed down. In this state, the elastic projection 19 is forcibly pushed out from the stopper hole 23, resulting in the state in which the extensible rod 5A can be lowered.

When the grip 4 is pulled up to the highest position, the stopper 18 shown in FIG. 10 can stop the grip 4 at this position without any special operation. Also, when the grip 4 is pushed down forcefully, the grip 4 can be lowered. Therefore, the stopper 18 has advantages that the grip 4 can be easily stopped at the position of being pulled up to the highest position and the grip 4 can be lowered easily. However, although not shown in the drawings, there can be used a known structure as the stopper, in which an operational button can be provided in the grip, for example. The stopper with this structure can be configured such that after the grip is pulled up to the highest position and stopped, the grip can not be pushed down unless the operational button is operated. In the stopper with this structure, since the grip can not be lowered even if the grip is pushed down forcefully, there is an advantage that the user can lean heavily on the stick when using the device of the invention as the stick.

Furthermore, the stopper 18 can stop the grip 4 at the position where the grip 4 is pushed down to the lowest point. In the stopper with this structure, the extensible rod and the guide pipe are provided with stopper holes or concave portions into which the elastic projections or balls are elastically pushed when the grip 4 is pushed down to the lowest position.

The bag 3, 63, 73 has a size which allows the bag to be placed on the horizontal loading table 2, 62, 72. Namely, the outline of the bag 3, 63, 73 in the plan view is approximately equal to an outline of the horizontal loading table, or smaller than that of the horizontal loading table, or slightly larger than that of the horizontal loading table. The height of the bag 3, 63, 73 is set lower than the grip 4, 64, 74 at the lowered position. The stick of the invention can be lifted and carried under the condition that the grip 4, 64, 74 is lowered and the bag 3, 63, 73 is placed on the horizontal loading table 2, 62, 72.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A self-standing walking stick comprising:
    a horizontal loading table having a rectangular section and two protruding sections that protrude from opposite ends of a first longitudinal side of the rectangular section;
    a first caster provided on a lower side of one of the protruding sections;
    a second caster provided on a lower side of the other protruding sections;
    third and fourth casters provided on a lower side of the rectangular section at the corners of the horizontal loading table located at opposite ends of a second longitudinal side of the rectangular section, respectively,
    each of the first, second, third and fourth casters including a wheel mounted on a rotational shaft, wherein the wheel can be freely moved on a horizontal plane by rotating the rotational shaft in a horizontal plane;

a first vertical rod having a lower end fixed at a first end section of the first longitudinal side of the horizontal loading table;

a second vertical rod having a lower end fixed at a second end section of the first longitudinal side of the horizontal loading table, wherein each of the first and second vertical rods can be extended and retracted in a vertical direction;

a grip extending in a horizontal direction, wherein opposite ends of the grip are connected to upper ends of the first and second vertical rods; and a bag detachably attached on the horizontal loading table.

2. The self-standing walking stick as recited in claim 1, wherein the horizontal loading table is integrally formed of plastic.

3. The self-standing walking stick as recited in claim 2, wherein the horizontal loading table is integrally formed with ribs extending lengthwise and crosswise on the lower side of the horizontal loading table, and each of the wheels has an outer diameter in a range of 30 to 60 mm.

4. The self-standing walking stick as recited in claim 2, further comprising:

a first vertical wall integrally formed with the horizontal loading table such that the first vertical wall extends along a first short side of the rectangular section of the horizontal loading table; and a second vertical wall integrally formed with the horizontal loading table such that the second vertical wall extends along a second short side of the rectangular section of the horizontal loading table, wherein the first and second vertical walls are connected to connection pipes for connecting the first and second vertical rods to the horizontal loading table.

5. The self-standing walking stick as recited in claim 1, wherein the grip is placed at a position of 20 to 80% when an interval between mounting positions of the first and second casters, which are provided on the protruding sections, is defined as 100%.

6. The self-standing walking stick as recited in claim 1, wherein an entire length of each of the first and second vertical rods is a height from each of the lower ends of the casters to the grip in the condition that the grip is pulled up to a maximum height, and said height is in a range of 60 to 100 cm.

7. The self-standing walking stick as recited in claim 1, wherein the first and second vertical rods are stopped by stoppers at a position where the grip is pulled up to a maximum height.

* * * * *